United States Patent [19]

Lee

[11] 4,133,141

[45] Jan. 9, 1979

[54] APPARATUS AND METHOD FOR GROWING PLANTS

[76] Inventor: Choong W. Lee, No. 1 Pesiaran Stonor, Kuala Lumpur 04-08, Malaysia

[21] Appl. No.: 861,366

[22] Filed: Dec. 16, 1977

[51] Int. Cl.² .......................... A01G 9/02; A01G 31/02
[52] U.S. Cl. ............................................ 47/79; 47/59
[58] Field of Search .................... 47/59, 66, 79–81, 47/63

[56] References Cited

U.S. PATENT DOCUMENTS

| | | | |
|---|---|---|---|
| 1,439,973 | 12/1922 | Olson | 47/80 X |
| 1,773,020 | 8/1930 | Willis | 47/79 |
| 2,531,562 | 11/1950 | Eve | 47/80 |
| 2,807,912 | 10/1957 | Bjorksten | 47/79 X |
| 3,754,352 | 8/1973 | Bates | 47/80 X |
| 3,896,586 | 7/1975 | Caldwell | 47/79 X |
| 3,927,491 | 12/1975 | Farnsworth | 47/63 |
| 4,040,207 | 8/1977 | Lancaster | 47/80 |

Primary Examiner—Robert E. Bagwill
Attorney, Agent, or Firm—Cushman, Darby & Cushman

[57] ABSTRACT

A tank is provided with a nutrient supply, a separate water supply and a body of particulate support medium for the plant roots. A valve is provided for controlling access to the nutrient supply. The plant roots also may grow into the water supply for obtaining water separately from nutrients. In one version, the plants grow at the center of the tank, surrounded by the nutrient supply; in another version the nutrient supply is at the center and the plants grow in a ring around it. Versions for use on land and floating on bodies of water are disclosed.

17 Claims, 8 Drawing Figures

APPARATUS AND METHOD FOR GROWING PLANTS

BACKGROUND OF THE INVENTION

It is neither new nor unusual for humans to grow plants for ornament or for food in places and by means that are unnatural. Growing plants in pots, e.g., as house plants, is a widespread example. Growing plants hydroponically is another.

There are more esoteric examples: the Indians, 600 years ago in what now is suburban Mexico City, Mexico, grew crops on floating rafts from which the plant roots dangled into the water.

Without exception in these prior efforts, so far as the present inventor is aware, nutrients for the plants were applied without using a device that will prevent the plant nutrients from contaminating the soil water. As the result sometimes a situation is created where the plants are unable readily to get plain water from the soil when the need of it arises. Plant nutrients are commonly supplied to the plants without water or without soil. It is quite common to find plant nutrients in organic or in inorganic form being directly applied to the soil. Plain water containing insignificant amounts of plant nutrients can be found in many types of soil. A soil can fix a small quantity of applied nutrients, and when nutrients are applied within the limit of the soil's capability to fix them, the plants readily can get plain water supply from the soil. However, when a large quantity of nutrients is used to increase the yield from the soil, a situation can arise where the soil fixing capability cannot cope with the load, the surplus nutrients get into the soil water, and under certain situations, can cause injury to the plant. The present invention solves the difficult problem of soil water contamination encountered when a large quantity of chemical fertilisers is required to be used in order to raise the high productivity of the soil.

SUMMARY OF THE INVENTION

A tank is provided with a nutrient supply, a separate water supply and a body of particulate support medium for the plant roots. A valve is provided for controlling access to the nutrient supply. The plant roots also may grow into the water supply for obtaining water separately from nutrients. In one version, the plants grow at the center of the tank, surrounded by the nutrient supply; in another version the nutrient supply is at the center and the plants grow in a ring around it. Versions for use on land and floating on bodies of water are disclosed.

The crop-growing device was invented by me for the growing of a wide variety of garden crops in places where conventional methods of farming with soil find it difficult, impossible or uneconomical to do.

The plant-growing device of the invention does not depend on the soil to store and supply the water and plant nutrients to the plant as is required in the conventional method of farming with soil. Preferably, a small quantity of ordinary sand is used in the plant-growing device for the purposes of germinating the seed, holding the plant in position, leading the roots of the plant to the water compartment where a good amount of water is stored, and leading the roots to the nutrient compartment. The small quantity of ordinary sand required makes it practical and economical to grow garden crops in places without soil. Although only a small amount of sand is used, the yield can compare favorably to that obtained by the conventional method of farming with soil using an area many times the size used in the plant-growing device of the invention. This is because almost three-quarters of the space in the device is occupied by the water compartment and the nutrient compartment. The water-holding capacity and the plant nutrient-holding capacity, being empty spaces can hold considerable amount of water and plant nutrients. These compartments are such designed that they can make instant available, water and plant nutrients separately to serve the changing requirements of the plant for water and nutrients in various weather conditions.

The plant-growing device has three unique features which I consider as new and unobvious:

The first unique feature: THE WATER AND PLANT NUTRIENTS ARE SUPPLIED SEPARATELY TO THE PLANT.

In the conventional method of farming with soil, no precaution is taken to see that the applied nutrients do not get mixed with the water in the soil. Consequently, whatever water is taken up by the plant contains plant nutrients of various concentrations. The application of water together with plant nutrients is a common and convenient method of supplying to the plant its requirement of water and nutrients. In hydroponic farming, water is always supplied to the plant with dissolved plant nutrients.

In the plant-growing device of the invention, the water in the water compartment and in the sand where the plant is growing, contains no plant nutrient, or only in insignificant amount. As the result, the water that the plant takes up for its metabolism, growth and reproduction, is largely free from nutrient salts. The advantages derived from this special feature of the present invention are as follows:

(1) As the water supply to the plant contains no nutrient salts, there is no problem of high nutrient salt concentration which effects the osmotic ability of the plant roots to take up water.

High concentration of nutrient salts in the soil water is a difficult problem to control in the conventional method of farming with soil, because there are several factors that effect the concentration of nutrient salts in the soil. For example, weather conditions, decomposition of organic matter, over-application of chemical fertilizers, and the lack of water in the soil, are some of the common causes.

In hydroponic farming, which supplies the water together with the plant nutrients, extra work is involved in the checking and adjusting of the solution to see that the salt concentration is neither too high nor too low for the plant under various weather conditions.

(2) Heavy rain cannot cause loss of plant nutrients through leaching. The rain water only fills up the water compartment and makes the water free from any trace of plant nutrients. The plant will grow better if the water in the sand and in the water compartment contains no plant nutrient.

In the conventional method of farming, heavy rain breaks up the soil structure, reducing its water-holding capacity, and leaches away the soluble nutrient salts.

In hydroponic farming, the solution of water and nutrients becomes too diluted when it rains and has to be checked and adjusted accordingly. This problem is so troublesome and wasteful that hydroponic farming has to be practiced under cover where rainfall is plentiful.

(3) As the water in the plant-growing device of the invention contains no plant nutrients, its pH value remains constantly around 7. It is the presence of nutrient salts in other devices and systems, especially the nitrogen compounds, that makes the pH value of the water too high for the plant. In hydroponic farming, where the plant nutrients are applied together with the water, the pH value of the solution gradually turns alkaline, and so has to be monitored and adjusted frequently.

(4) Lastly, and the most important advantage is that the need for water and plant nutrients, and in what quantity is decided by the plant itself. The plant is given the choice of taking what it really requires under different weather conditions. For instance, during a hot windy day, the plant through transpiration, loses a great amount of water which has to be replaced. As the water in the plant-growing device of the invention contains no plant nutrients, it can take in any amount of water without taking in any nutrient salts. Any nutrient it needs can be taken from the nutrient compartment, where all the plant nutrients in considerable quantity are stored. On a wet day when the loss of water through transpiration is much less, less water is taken up, but because the supply of the nutrients in the plant-growing device is in concentrated strength, the plant can easily take up its full requirement.

In the conventional method of farming the plant has no choice. It cannot take in the water to replace the considerable loss through transpiration without taking in the nutrients. Nutrient salt damage to the plant can easily occur, especially so when the soil is rich in plant nutrients. The application of chemical fertilizers has to be done with care. On the other hand, the application of chemical fertilizers as plant nutrients in the plant-growing device of the invention is simple and large amount of a suitable chemical fertilizer can just be simply filled in till the nutrient compartment is full. To last for a longer period, a bigger quantity is put in, while for a shorter period, or for economical reason, a lesser amount can be applied. There is no danger of nutrient salt damage to the plant, or to the germinating seed.

The second unique feature in the plant growing device: THE NUTRIENT VALVE. The Nutrient Valve includes the nutrient compartment where the plant nutrients are stored. The nutrient valve will allow the plant to take its full requirement of nutrients without allowing the nutrients to get into the surrounding where the plant grows, and thus it makes it possible to supply the water and plant nutrients separately. The nutrient valve makes it possible to grow food crops over fresh water bodies, and to prevent the contamination of their water with the plant nutrients, even when large quantity is applied. The plant nutrients remain in the nutrient valve even under heavy rain, until they are finally all used up by the plant. Thus great economy in the use of fertilizers is effected.

The third unique feature of the plant-growing device: THE WAY WATER IS STORED AND MADE INSTANTLY AVAILABLE TO THE PLANT WHOSE REQUIREMENT OF WATER VARIES GREATLY UNDER DIFFERENT WEATHER CONDITIONS.

The plant-growing device uses a column of sand to draw up by capillarity the water stored in the water compartment to the surrounding area where the plant is growing. A special air space is created over the water compartment to drain off surplus water delivered by any heavy rain, and to oxygenate the water so that the roots can penetrate right into the water stored in the water compartment and to take up its requirements of water to supplement the water supplied by the sand column. Thus by using the sand column, the air space, and the water stored in the water compartment, water is made instantly available to the plant under various weather conditions. This system of supplying water to the plant not only saves frequent watering, but also makes it possible to grow the plants more compactly than in soil when used in the conventional method of farming, as large quantity of water is made instantly available to the plants.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION OF THE PRESENTLY PREFERRED EMBODIMENTS OF THE PRESENT INVENTION

Figure 1:
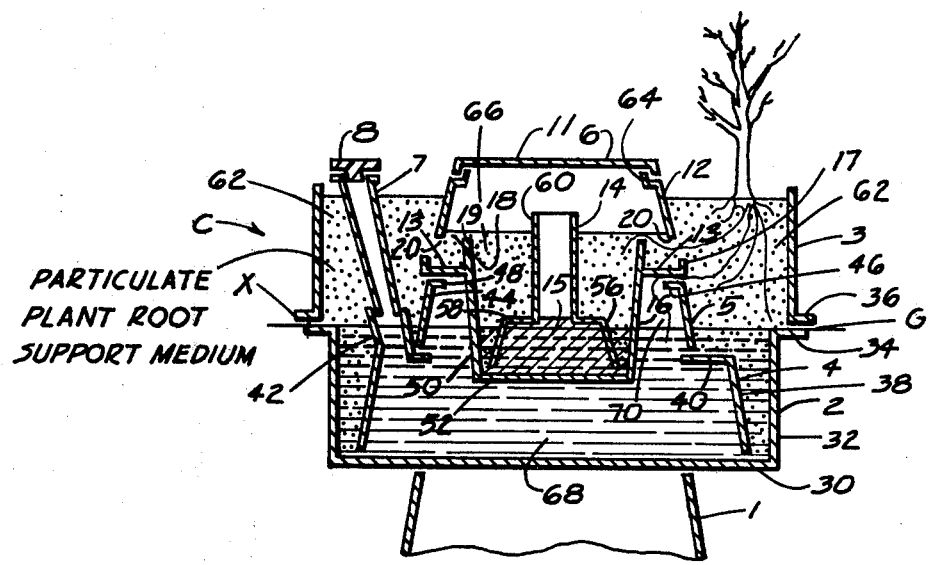
FIG. 1 is a longitudinal sectional view of a centrally valved version of the plant-growing device of the present invention.
Figure 2:
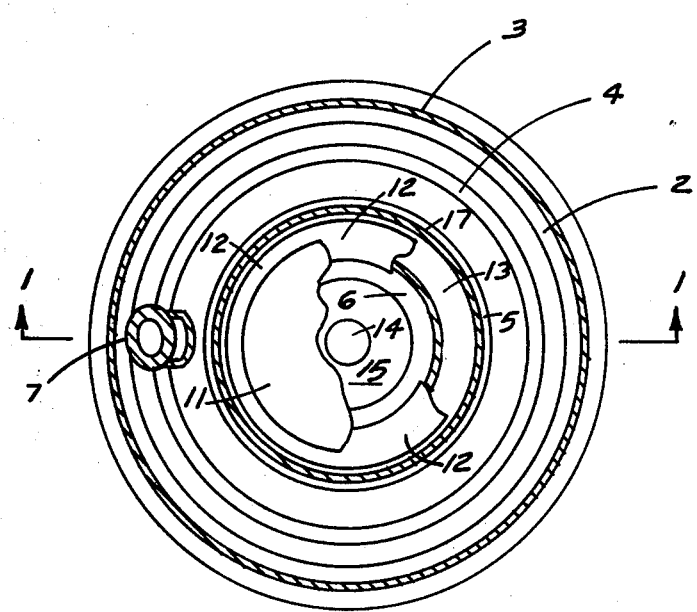
FIG. 2 is a top plan view thereof with portions broken away to expose interior details.
Figure 3:
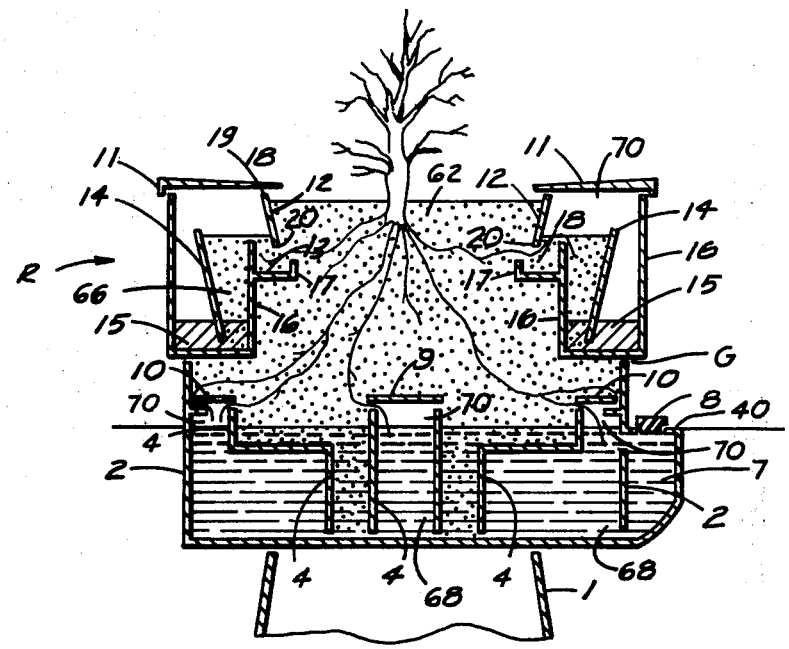
FIG. 3 is a longitudinal sectional view of a peripherally valved version of the plant-growing device of the present invention.
Figure 4:
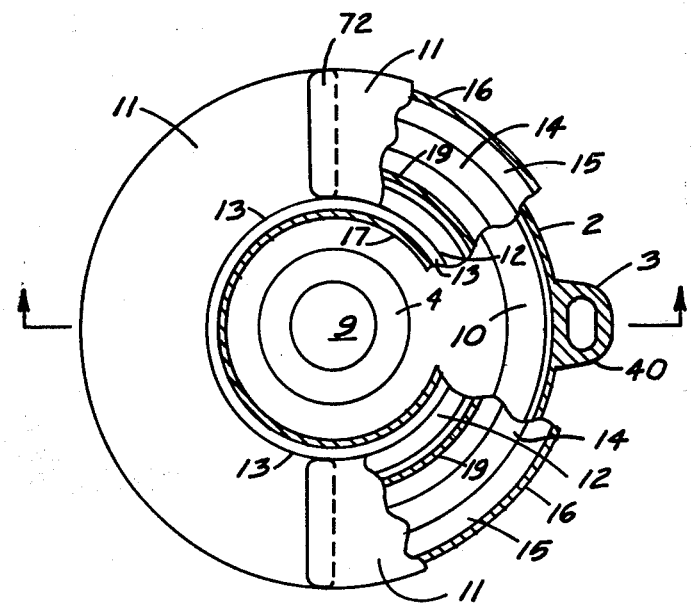
FIG. 4 is a top plan view thereof with portions broken away to expose interior details.

For illustrative purposes, two plant-growing devices that appear to be different upon casual inspection are shown and described, one in FIGS. 1 and 2 (designated C), the other in FIGS. 3 and 4 (designated R). However, the devices C and R have comparable component parts and work on the same principle. For ease of comparison, the comparable elements have been given like numerals or letters as designators.

Referring to FIGS. 1 and 2, the plant-growing device C includes a tank 2 having a bottom wall 30 and an upstanding outer peripheral sidewall 32 with a radially out-turned circular flange 34 at its upper end. The tank 2 is shown supported upon an optional pedestal or stand 1 for raising the device to a convenient height and for making it less accessible to certain pests such as snails.

A separable cylindrical sidewall member 3 is provided, having a radially out-turned flange 36 at the lower end thereof. In use, the sidewall member 3 is supported on the sidewall 32 of the tank 2 by coaxially resting the flange 34 on the flange 36.

Within the tank 2, there rests coaxially on the tank floor 30 an annular, water compartment-defining wall member 4. This member, as shown, has an upwardly tapering, frusto-conical sidewall 38 with an annular flange 40 radiating inwardly at the upper end thereof at a level below the gap G between the flanges 34 and 36.

At one location, the flange 40 is shown provided with an upwardly opening tubular neck 42 which extends to above the level of the flange 34. A water inlet tube 7 is fitted into the neck 42 and extends upwards to above the upper end of the sidewall member 3. There the water inlet tube 7 is provided with a removable stopper 8.

An annular air-space-defining wall member 5 rests coaxially on the flange 40. This member, as shown, has an upwardly tapering, frusto-conical sidewall 44 with an annular flange 46 radiating inwardly at the upper end thereof at a level above the gap G. Thus, the flange 46 has a central opening 48. A nutrient valve 6 is received in this opening 46 and is suspended from the flange 46 so that it extends above and below the flange 46.

The nutrient valve 6 includes a container 16, shown having an upwardly flaring frusto-conical sidewall 50 and a bottom wall 52. An annular capillarity stop flange 13 radiates coaxially outwardly from the sidewall 50 intermediate the height thereof. It is the flange 13 which rests on the flange 46 to suspend the nutrient valve 6 in the position shown. At its radially outer extent, the flange 13 is provided with a circumferentially extending, upwardly projecting, axially short ridge 17.

Within the container 16, there is shown coaxially received a nutrient chamber member 54 which includes, as shown, an upwardly tapering frusto-conical sidewall 56 with an inwardly radiating annular flange 58 at its upper end. A filler neck 60 extends upwardly from the radially inner extent of the flange 58.

The open upper end or orifice 14 of the filler neck 60 lies slightly above the upper edge 19 of the container 16. The container upper edge 19 lies somewhat below the upper end of the sidewall member 3.

In use, a particulate plant root support medium such as sand is filled into the annular space between elements 2, 3 and 4, 5, 16 and into the annular space between element 16, sidewall 50 and the nutrient chamber member 54. Then a controller 12 is put in place. As shown, the controller 12 is an upwardly tapering, frusto-conical annular wall. The lower edge 20 of the controller 12 is at approximately the level of the upper edge 19 of the container 16 and the lower edge 20 is disposed radially intermediate the radial extent of the capillarity stop flange 13.

Then more particulate plant root support medium such as sand is filled into the annular space between the sidewall 3 and the controller 12 to anchor the controller 12 in place and to complete filling the region 62 where the plants are to be grown.

Through the central opening 64 at the upper end of the controller 12, a small additional amount of plant root support medium such as sand is added outside the filler neck 60 and spread over the upper end 19 of the container 16 to physically bridge and join the two regions of plant root support medium 62 and 66.

The nutrient chamber 15 is filled with plant nutrients through the orifice 14 and the controller cover 11 is put in place. The water compartment 68 is filled with water to the level of the gap G by removing the cap 8, pouring water down the inlet 7 and replacing the cap 8. Region 70 remains as an air space. Seeds, seedlings, cuttings or the like are planted in the plant root support medium in the annulus 62 and the plant growing process is thus begun.

Plant nutrients leak from under the sidewall 56 and into the sand within the container 16, travelling upwards by capillary action to the thin sand bridge 18 overlying the upper edge 19 of the container 16. To reach these nutrients, the growing plants send roots from the annulus 62, through the sand bridge 18 and into the region 66. The height of the sand over the container edge 19 controls the horizontal movement of nutrients through the bridge to the annulus 62. The amount of root growth through the sand bridge 18 depends on the concentration of plant nutrients in the bridge region 18. As the nutrients are used up, the roots, to get more nutrients, penetrate more deeply into the sand of the container 16. The sand bridge 18 is wide enough to allow the plant roots freely to get into the nutrient supply to take as much nutrients as are required by the plant.

The bottom edge 20 of the controller 12 is preferably about one-eighth inch below the level of the upper edge 19 of the container 16. Accordingly, when it rains, or if water is sprinkled upon the device C, the cover 11 and controller 12 prevent the water from entering the container 16 and the nutrient chamber 15. This relative disposition also aids in restricting horizontal movement of plant nutrients across the sand bridge.

Typically, the capillarity stop flange 13 is located about one and one-half inches below the upper edge 19 of the container 16. Typically, the ridge 17 is one-half inch high, and the flange 13 is of sufficiently great relative diameter that approximately is radially outer three-quarters of an inch, leading to the ridge 17, lies radially beyond and thus is not covered by the controller 12 and, instead, is exposed to water falling from above.

Accordingly, when it rains, or if water is sprinkled on the device C, a small controlled amount collects in the annular dish defined by the flange 13 and ridge 17. This small amount of water, being at a higher level than the level of the nutrient solution in the region 66, tends to rise under the controller and cross the sand bridge 18 into the region 66. Were it not for the flange/ridge dish 13, 17, and its relation to the controller 12 and said bridge 18, the nutrient solution in nutrient chamber 15 would escape by capillarity action, into the area where the plant gets its plain water supply, thus causing serious injury or even death to the plant. A large quantity of plant nutrients is placed in concentrated strength in the nutrient chamber 15 so that the high demand of the compactly grown plants can be met for a long period of time without the need of refilling. If a little bit of the concentrated nutrients gets into the area where the plant draws its plain water supply, serious damage can be caused to the plant. The flange/ridge 13, 17, the controller 12, the sand bridge 18, the width of the container's edge 19, and the height of the sand over the edge 19 are built into the device to stop, entirely if possible, the escape of the nutrients from the nutrient chamber 15 into the area where the plant draws its water supply. The flange/ridge dish 13, 17, is designed to trap some water falling from above and to use this water to push back into the region 66 as much as possible any escaped nutrients that crossed the sand over the container's edge 19. At the same time the flange/ridge dish 13, 17 is used to stop the action of the gravitational force that can accelerate the capillarity action that can draw the nutrient out of the nutrient chamber 15. This gravitation force occurs when the water level in the water compartment is lower than the nutrient solution level within the container 16. In FIG. 1, note that the levels are about the same, hence this gravitational force does not occur, but when the water level falls when the supply in the water compartment is used up by the plants, a difference of these two levels will create a potential force that can turn to a kinetic force (the rate of change depends on the moisture and the compactness of the sand) which can exert an influence that can help the escape of the nutrients in the container 16 out into the area where the plant draws its plain water supply.

It it were not for the capillarity stop flange, when the plant root support medium was wetted, concentrated nutrients in solution would wick or siphon over the edge 19 and descend into the plain water supply 68 making it impossible for the plant roots to take up plain water.

By preference, all of the device C may be made of moldings of portland cement. Other materials, including synthetic plastics could be used for manufacturing some or all of the parts.

A typical device C contains about five gallons of water in the water compartment and about four gallons of water in the ring column of sand at 62. This is sufficient to supply, for instance, about eight fully grown maize plants for about three days without need for adding water. About 1-3 cubic feet of sand is used in this typical device which, when empty, weighs about 150 pounds.

The growing plants are anchored in the plant root support medium (e.g., sand) in the ring column 62. From there, the plants may send roots more deeply and/or under the flange 13 and into the water compartment to supply their need for water. Independently, the plants may send roots toward and across the sand bridge 18 and even into the ring column of nutrient-laden sand 66 to supply their need for plant nutrients. The plant nutrients are available when needed and are not leached away. Other particulate plant root support media may be used, e.g., vermiculite or mixtures of various such media may be used.

A wide variety of vegetables, fruiting plants and other plants may be grown in the plant-growing devices of the invention. Typical examples of plants which may be grown include: maize (corn), beans, tomatoes, sweet potatoes, flowers, midget fruit trees, orange trees, gingers, cowpeas, turnips and cucumbers. The devices may be used on hilly land where cultivation by conventional means would cause serious erosion, and in places where there is no soil, such as upon cement floors, flat roof tops, on rocky ground, on fresh water lakes, ponds, swamps, and even on the oceans, using floating supports or piers.

A second model of the plant-growing device is shown at R in FIGS. 3 and 4.

By a rearrangement of elements, in the FIGS. 3 and 4 version, the nutrient valve 6 is provided as a ring coaxially surrounding a central plant growing region 62 and the water compartment 68 is divided into central, and ring-shaped outer peripheral portions.

The essential functions and interrelations remain the same. (In a minor departure, the tubular neck 42 of the FIGS. 1 and 2 version is shown omitted so the removable stopper 8 is placed directly in an opening in the flange 40 so the maximum water level in the water compartment is the level of the stopper, rather than the level of gap G.)

The growing plants may send roots to nutrient-free water through between the water compartment defining walls 4 and their respective covers 9, 10. Also the plants may send roots between the ridge 17 on the capillarity stop flange 13, and the lower edge 20 of the controller 16, over the sand bridge 18 and into the nutrient-rich sand annulus 66.

For convenience, the ring-shaped cover 11 of controller 12 may be made in sections (with lap joints at 72) for ease in removing or raising this cover, e.g., for adding plant nutrients to the nutrient chamber 15.

Figure 5:
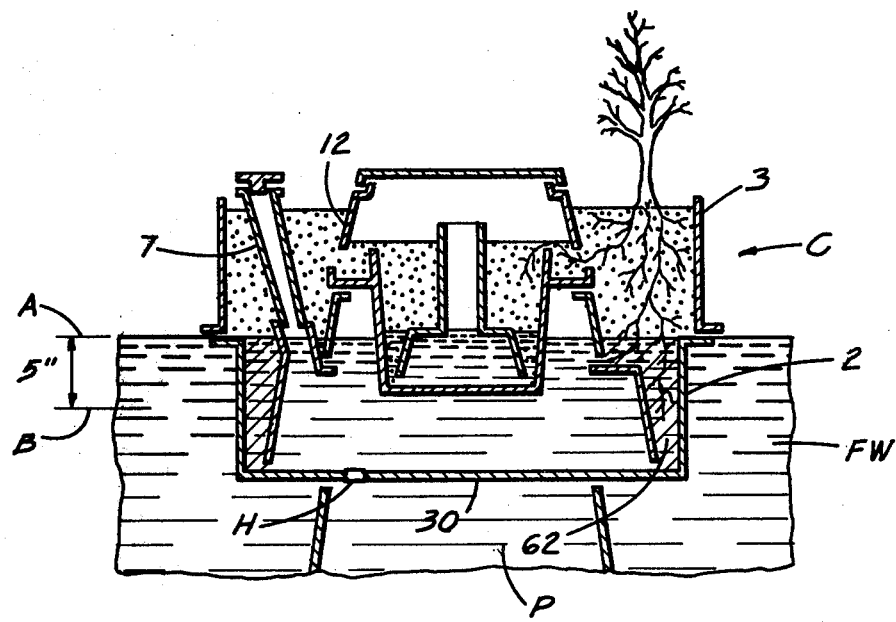
FIG. 5 is a longitudinal sectional view of a variation of the FIG. 1 device, supported on a pier in fresh water.

FIG. 5 shows a variation of the plant-growing device C adapted for use partially submerged in a shallow body of fresh water FW, in which it is supported on a pier P. A hole H, e.g., one-half inch diameter is provided in the bottom wall of the tank 2 for the admission of water from the body FW into the water compartment. The height of the pier P is such that when the plant-growing device C rests thereon, the device C is partially submerged, preferably to the level A of the gap G between the outer flanges of the tank 2 and the sand-holding circular wall 3. The water level must not rise higher than level A, nor drop below level B for more than a few hours. The difference between levels A and B, typically, is about five inches. A constant water level A is best. It is not practical to use this version of the device where the water often fluctuates to a greater degree. In this version, water is made constantly available to the water compartment by entering through the hole H, and by entering through the gap G when submergence is to the level A. Should the water level of FW drop below B, the hole H may be check-valved shut with a plug (not shown) and water added through inlet tube 7.

Figure 6:
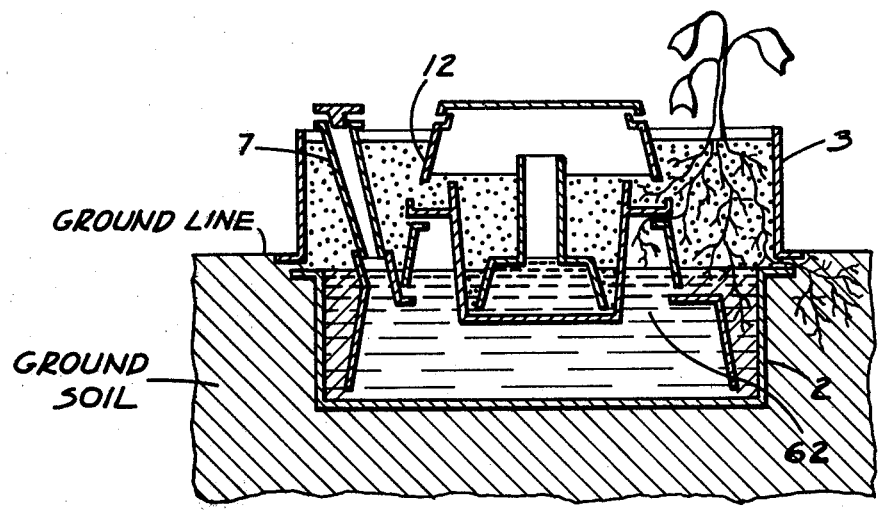
FIG. 6 is a longitudinal sectional view of a variation of the FIG. 1 device partially buried in the ground.

FIG. 6 shows a variation of the plant-growing device C, partially submerged in the earth, so that the gap G is buried about two inches. Thus, in addition to the capabilities and performance characteristics described above in relation to FIGS. 1 and 2, this version permits plant roots to grow out through the gap G, into the soil surrounding the device, to make use of the soil water and of any nutrients if found therein.

Figure 7:
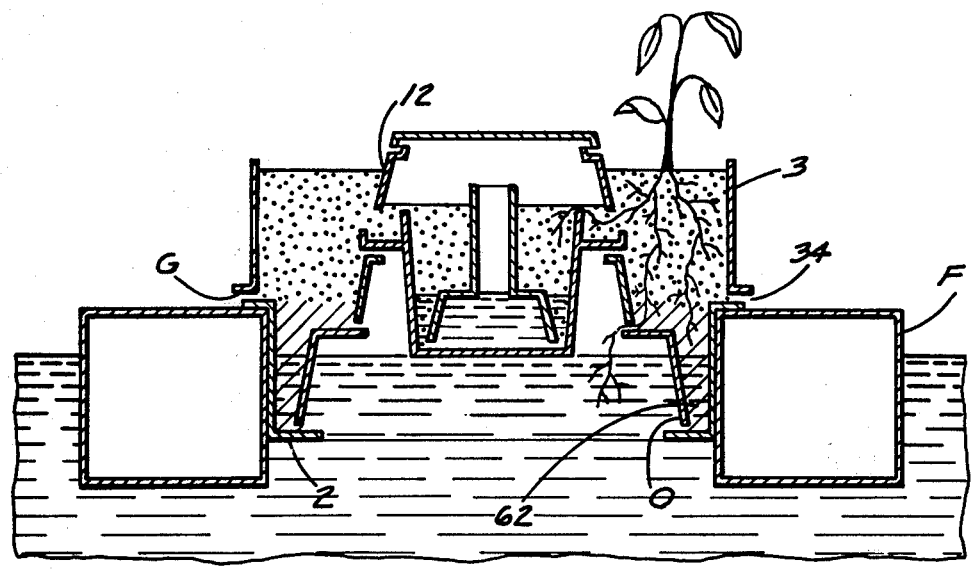
FIG. 7 is a longitudinal sectional view of a variation of the FIG. 1 device floating upon a body of fresh water.

FIG. 7 shows a variation of the plant-growing device C, supported via the outer flange 34 of the tank 2, in the central opening of a ring-shaped pontoon or float F on the body of fresh water FH. A large opening O is centrally formed in the bottom wall of the tank 2, so that the plant roots may grow therethrough into the body of fresh water FH. The level of support provided by the float F is such that the gap G remains near but above the surface of the body of fresh water FH.

Figure 8:
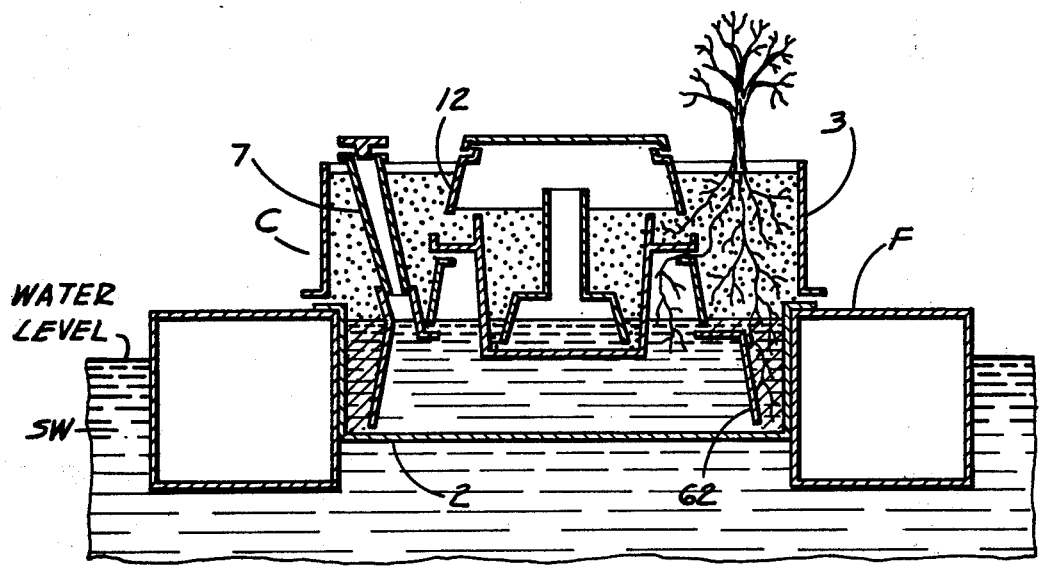
FIG. 8 is a longitudinal sectional view of the FIG. 1 device, floating upon a body of salt water.

FIG. 8 shows a variation of the plant-growing device C, supported via the outer flange of the tank 2, in the central opening of a ring-shaped pontoon or float F on a body of salt water SW. In this version there is no opening in the bottom wall of the tank 2 and the tank 2 is made of salt-water impervious material. Thus, the water compartment must be filled with fresh water through the water inlet tube 7, except when there is sufficient rainfall. (This version is essentially like the version shown in FIG. 1, except that the stand 1 is replaced by the float F and the body of salt water SW.) The purpose of this variation is to permit farming upon the ocean, in regions where people have access to the ocean, but no land to farm. Of course, the float F must support the plant-growing device at a sufficiently high level that salt water cannot enter through the gap G (or it must be sealed shut), nor splash upon the growing plants.

It should now be apparent that the apparatus and method for growing plants as described hereinabove, possesses each of the attributes set forth in the specification under the heading "Summary of the Invention" hereinbefore. Because it can be modified to some extent establishing a body of particulate, plant root-support medium and rooting a plant therein;

establishing a reservoir of water having a first interface with said body of particulate, plant root-support medium so that water from said reservoir wets said body of particulate, plant root-support medium via said first interface and said plant is free to send roots into said reservoir of water via said first interface; and establishing a reservoir of plant nutrients, separate from said reservoir of water but having a second interface with said body of particulate, plant root-support medium;

establishing a bridge of capillary medium extending through the second interface from the reservoir of plant nutrients to the body of particulate, plant root-support medium;

providing the capillary medium with a controlled limited supply of water, which being placed at a higher level than the nutrient solution level, tends to retard the action of the capillarity force that helps the escape of the nutrients in the reservoir of plant nutrients into the reservoir of water.

* * * * * without departing from the principles thereof as they have been outlined and explained in this specification, the present invention should be understood as encompassing all such modifications as are within the spirit and scope of the following claims.

What is claimed is:

1. A plant-growing device, comprising:

an upwardly open receptacle, having a floor and an upstanding outer peripheral wall;

wall means separating the interior of the receptacle into three regions: a plant-growing region adapted to contain a body of particulate, plant root-support medium in which plants may be rooted, a water compartment and a nutrient container;

said wall means providing a first interface with a first path of physical communication between the plant-growing region and the water compartment and a second interface with a second path of physical communication between the plant-growing region and the nutrient container;

wall means dividing the nutrient container into a first chamber for containing a bulk supply of plant nutrients in concentrated form, a second chamber for receiving a capillary medium in contact with said second path, and a third path of physical communication between the first and second chambers distally of said third path, so that plant nutrients, to reach the plant-growing region from said bulk supply, must traverse from said third path to said second path, across said capillary medium, at least largely by capillary action;

and basin means for catching a limited quantity of water in the vicinity of said second path, and in communication therewith, for providing at least some of the moisture necessary for retarding said capillary action.

2. The plant-growing device of claim 1, said third path is disposed substantially below said second path, and said basin means includes a generally horizontal flange projecting into the plant-growing region from the wall means which separate the nutrient container from the plant-growing region, at a site which immediately underlies said second path, at least a portion of said flange facing upwardly within said plant-growing region, for catching thereon by percolation from such water as is exteriorly received upon the plant root-support medium, said limited quantity of water.

3. The plant-growing device of claim 2, further including:

wall means roofing over said second pathway and extending over only part of said flange proximally of said wall means which separate the nutrient container from the plant-growing region.

4. The plant-growing device of claim 3, wherein:

said wall means which separate the nutrient container from the plant-growing region is generally tubular and generally vertically oriented with the nutrient container being central and the plant-growing region being outer-peripheral and ring-shaped.

5. The plant-growing device of claim 3, wherein:

said wall means which separate the nutrient container from the plant-growing region is generally tubular and generally vertically oriented with the plant-growing region being central and the nutrient container being outer-peripheral and ring-shaped.

6. The plant-growing device of claim 3, further including:

a ground-supported pedestal supporting said receptacle.

7. The plant-growing device of claim 3, further including:

a body of water bottom-supported pier supporting said receptacle with said receptacle but partially submerged therein; and means defining a submerged water inlet through said receptacle into the water compartment thereof for supplying the water compartment with water through the inlet.

8. The plant-growing device of claim 3, further including:

a floatation pontoon supporting and buoying said receptacle upon a body of water with said receptacle but partially submerged therein.

9. The plant-growing device of claim 8, further including:

means defining a submerged water inlet through said receptacle into the water compartment thereof for supplying the water compartment with water through the inlet.

10. The plant-growing device of claim 3, further comprising:

means defining at least one opening through the outer peripheral wall of the receptacle intermediate the height of said outer peripheral wall for regulating the level of water in the water compartment by permitting leakage of water out through said at least one opening should the level of water within the receptacle and in communication with said at least one opening lie above said at least one opening.

11. The plant-growing device of claim 10, wherein said at least one opening is provided by respective circumferentially extending flange means on said receptacle defining a circumferentially extending gap therebetween as said at least one opening.

12. The plant-growing device of claim 11, wherein:

said receptacle is buried in the ground to the level of said gap.

13. The plant-growing device of claim 3, further comprising an upstanding peripheral ridge bordering said flange of said basin means.

14. The plant-growing device of claim 13, wherein:

said wall means roofing over said second pathway includes a controller portion which extends downward slightly more than the second interface extends upwards, and terminates radially between said ridge and said second interface.

15. The plant-growing device of claim 14, further including:

a body of particulate, plant root-support medium filling the plant-growing region sufficiently to at least partially bury said controller portion; and a body of capillary medium filling said second chamber of said nutrient container, said body of capillary medium extending between said second and third paths and bridging over said second interface into physical contact with said body of particulate, plant root-support medium.

16. The plant-growing device of claim 15 wherein:

both said body of particulate, plant root-supporting medium and said body of capillary medium are constituted by sand.

17. A method for growing plants, comprising:

UNITED STATES PATENT AND TRADEMARK OFFICE
CERTIFICATE OF CORRECTION

PATENT NO. : 4,133,141

DATED : Jan. 9, 1979

INVENTOR(S) : Lee Choong Wah

It is certified that error appears in the above—identified patent and that said Letters Patent are hereby corrected as shown below:

In Line [76] of the heading the inventor's name should be given as -- Lee Choong Wah --, of which "Lee" is the inventor's family name.

Signed and Sealed this

Twenty-sixth Day of August 1980

[SEAL]

Attest:

SIDNEY A. DIAMOND

Attesting Officer     Commissioner of Patents and Trademarks